(12) United States Patent
Ueno et al.

(10) Patent No.: US 8,295,650 B2
(45) Date of Patent: Oct. 23, 2012

(54) INFORMATION PROCESSING APPARATUS AND METHOD, AND PROGRAM

(75) Inventors: Ichiro Ueno, Saitama (JP); Baiping Liao, Saitama (JP); Hiroyuki Tominaga, Kanagawa (JP)

(73) Assignee: Sony Corporation (JP)

( * ) Notice: Subject to any disclaimer, the term of this patent is extended or adjusted under 35 U.S.C. 154(b) by 1095 days.

(21) Appl. No.: 11/704,177

(22) Filed: Feb. 8, 2007

(65) Prior Publication Data

US 2007/0206101 A1 Sep. 6, 2007

(30) Foreign Application Priority Data

Feb. 10, 2006 (JP) .................. P2006-033655

(51) Int. Cl.
*G06K 9/00* (2006.01)
*G06K 9/34* (2006.01)
*G06K 9/40* (2006.01)
*G06K 9/36* (2006.01)
*G06K 9/60* (2006.01)
*H04N 5/76* (2006.01)

(52) U.S. Cl. ........ 382/305; 382/113; 382/173; 382/254; 382/276; 382/306; 348/231.3

(58) Field of Classification Search .................. 382/305, 382/306; 348/231.3
See application file for complete search history.

(56) References Cited

U.S. PATENT DOCUMENTS

| | | | |
|---|---|---|---|
| 6,026,433 A | 2/2000 | D'Arlach et al. | |
| 6,161,124 A | 12/2000 | Takagawa et al. | |
| 6,282,362 B1 * | 8/2001 | Murphy et al. | 386/224 |
| 6,437,797 B1 * | 8/2002 | Ota | 345/638 |
| 6,657,661 B1 | 12/2003 | Cazier | |
| 7,096,428 B2 * | 8/2006 | Foote et al. | 715/721 |
| 7,325,061 B2 * | 1/2008 | Haruki | 709/226 |
| 2001/0022621 A1 * | 9/2001 | Squibbs | 348/232 |
| 2002/0005866 A1 * | 1/2002 | Gorham et al. | 345/760 |
| 2002/0029257 A1 | 3/2002 | Watanabe et al. | |
| 2004/0218894 A1 | 11/2004 | Harville et al. | |
| 2006/0161344 A1 * | 7/2006 | Iwahori et al. | 701/211 |

FOREIGN PATENT DOCUMENTS

| | | |
|---|---|---|
| CN | 1187650 A | 7/1998 |
| CN | 1341911 A | 3/2002 |
| CN | 1452091 A | 10/2003 |

(Continued)

OTHER PUBLICATIONS

Muranoi, JP2001-229165 Machine Translation, Date Published: Aug. 24, 2001.*

(Continued)

*Primary Examiner* — Brian Q Le
*Assistant Examiner* — Jose M Torres
(74) *Attorney, Agent, or Firm* — Lerner, David, Littenberg, Krumholz & Mentlik, LLP

(57) ABSTRACT

An information processing apparatus may include the following elements: an image information obtaining unit which obtains image information having at least position information added thereto as additional information, a map information storage unit which stores map information, a template information storage unit which stores template information including a template of content information, a map information obtaining unit which obtains map information corresponding to the position information added to the image information obtained by the image information obtaining unit from the map information stored in the map information storage unit, and a content information creating unit which creates content information using at least the map information obtained by the map information obtaining unit on the basis of the template information.

10 Claims, 11 Drawing Sheets

FOREIGN PATENT DOCUMENTS

| | | |
|---|---|---|
| EP | 1 083 567 | 3/2001 |
| JP | 2001229165 A | 8/2001 |
| JP | 2002-038223 A | 2/2002 |
| JP | 2004-218894 A | 8/2004 |
| JP | 2004-233150 A | 8/2004 |
| JP | 2004-250205 A | 9/2004 |
| JP | 2005136604 A | 5/2005 |
| WO | 2005/122011 | 12/2005 |

OTHER PUBLICATIONS

First Office Action corresponding to Chinese Application No. 200710080136.8 dated Jun. 6, 2008.

Second Office Action corresponding to Chinese Application No. 200710080136.8 dated Dec. 12, 2008.

"Red Hen Systems. Inc—Media Mapper" Internet Citation, [Online] Jul. 5, 2002,Retrieved from the Internet on Oct. 28, 2004: http://www.afdsiiet/mediamapper.html.

Berry J K et al: practical applications of video mapping in Natural Resources' Internet Citation, [Online] Jul. 4, 2002, Retrieved from theInternet on Oct. 28, 2004:http://www.innovativegis.com/basis/misc/G501VMS.htm.

Harville M et al: "MediaBeads: An Architecture for Path-Enhanced Media Applications" IEEE International Conference on Multimedia and Expo, Jun. 27, 2004, pp. 1-5.

Samadani R et al: "PathMarker: Systems for Capturing Trips" Internet Citation, [Online] Jun. 1, 2004, pp. 1-4, HP Laboratories Palo Alto, USA Retrieved from the Internet on Dec. 2, 2004: http://www.hpL.hp.com/personal/Michael_Harville/papers/pathMarkerICME04pdf.

Office Action from Japanese Application No. 2006-033655, dated Mar. 29, 2011.

Office Action from Japanese Application No. 2006-033655, dated Jun. 14, 2011.

* cited by examiner (a)

(b)

MAIN PAGE OF TRAVEL REPORT

PAGE LINKED FROM "TRAVEL RECORD FOR A CITY"

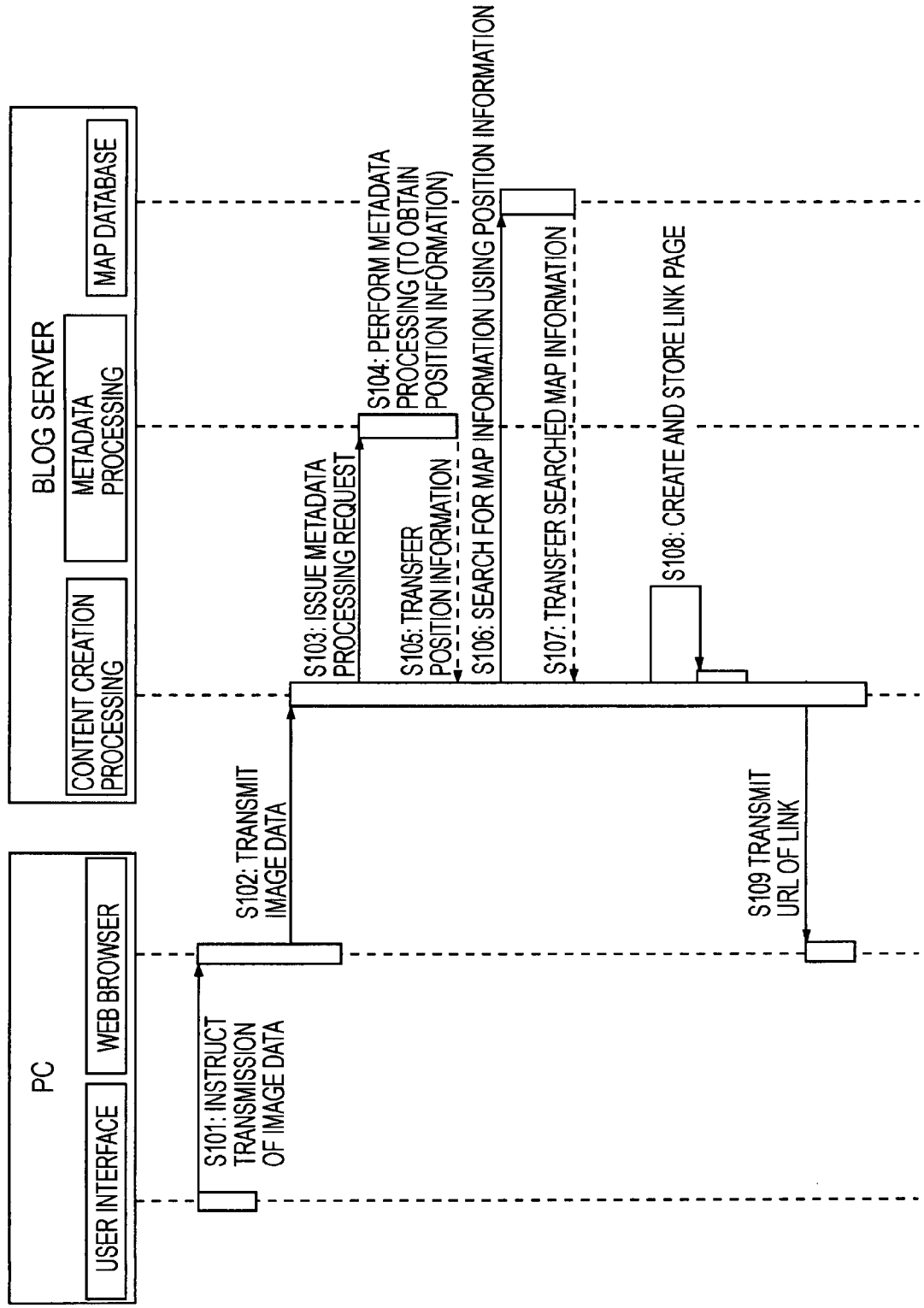

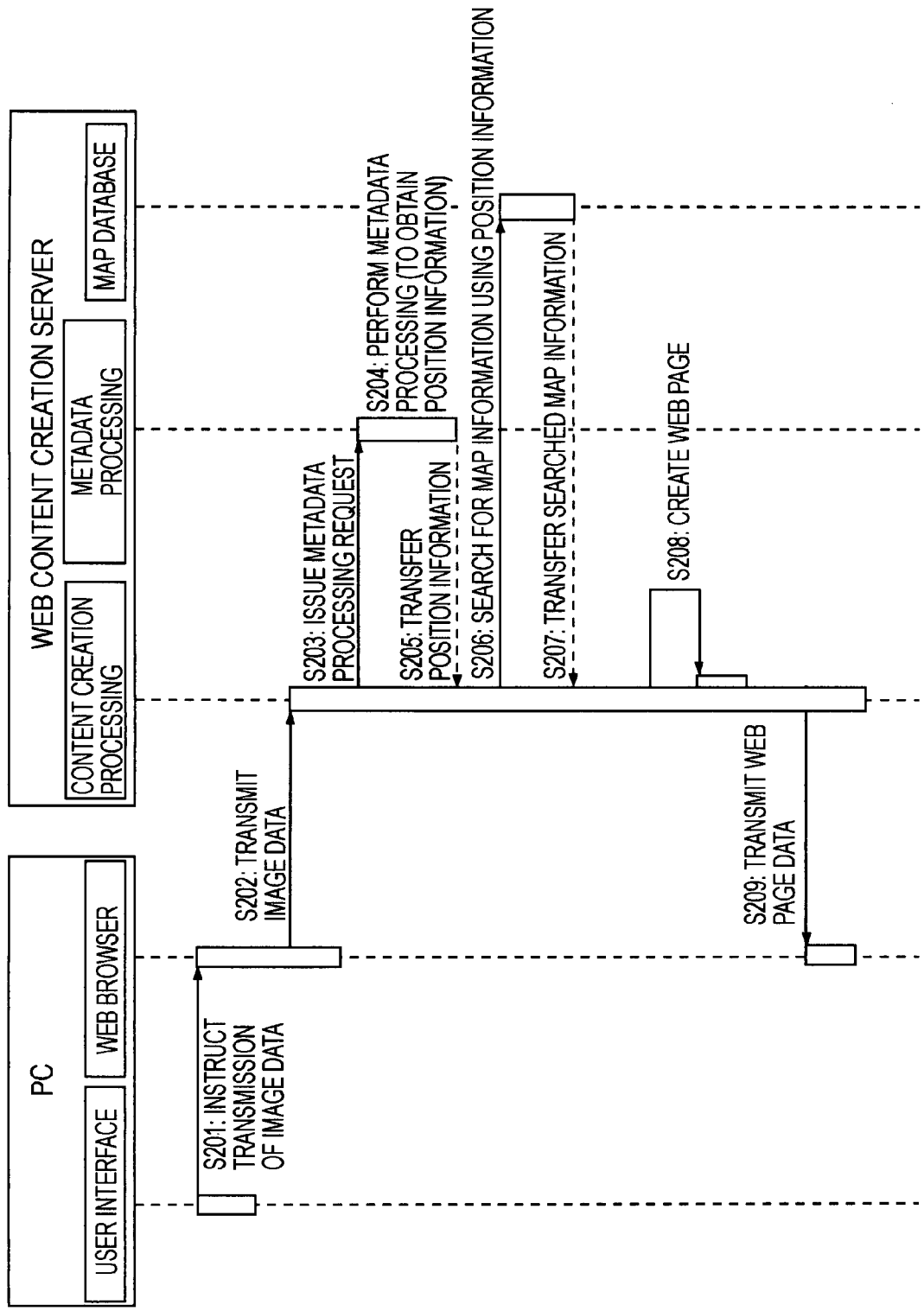

INFORMATION PROCESSING APPARATUS AND METHOD, AND PROGRAM

CROSS-REFERENCE TO RELATED APPLICATIONS

This application claims priority from Japanese Patent Application No. JP 2006-033655 filed in the Japanese Patent Office on Feb. 10, 2006, the entire content of which is incorporated herein by reference.

BACKGROUND OF THE INVENTION

1. Field of the Invention

The present invention relates to an information processing apparatus having a function for creating information such as content information, and to a method for the information processing apparatus.

The present invention further relates to a program executed by the information processing apparatus.

2. Description of the Related Art

With the use of a device having a global positioning system (GPS) function in combination of an image capturing apparatus such as a video camera or a digital still camera, position information associated with the capture time can be added as additional information to files of image data (image files) based on moving images or still images recorded by the image capturing apparatus.

The image files with position information can be used for various software applications such as map applications. Once an image file with position information is read into a map software application, the map software application displays the image corresponding the read image file and the position at which the image file was captured (recorded) using a map image. Such a technique is disclosed in Japanese Unexamined Patent Application Publication No. 2004-233150.

SUMMARY OF THE INVENTION

Accordingly, adding position information to image data facilitates the use in association with a map image, and therefore enhances the usability. In the current situation, however, such position information added to image data can merely be used by map applications. It is therefore desirable to more effectively use image data having position information.

An information processing apparatus according to an embodiment of the present invention may include the following elements. Image information obtaining means obtains image information having at least position information added thereto as additional information. Map information storage means stores map information. Template information storage means stores template information including a template of content information. Map information obtaining means obtains map information corresponding to the position information added to the image information obtained by the image information obtaining means from the map information stored in the map information storage means. Content information creating means creates content information using at least the map information obtained by the map information obtaining means on the basis of the template information.

In the above-described structure, first, when image information is obtained, information corresponding to position information added to the image information may be retrieved from map information and obtained. The information retrieved from the map information may be used to create content information. That is, in the embodiment of the present invention, the position information included in the image information may be used, thereby automatically creating content information.

According to an embodiment of the present invention, therefore, content information may be automatically created on the basis of position information added to image information, and image data having position information can be more effectively used. A more specific advantage is that content information may be created once an information processing apparatus according to an embodiment of the present invention obtains image data having position information, thus allowing simple and easy creation of content information.

BRIEF DESCRIPTION OF THE DRAWINGS

FIG. 10 is a diagram showing a processing procedure for automatically creating a blog link page according to the embodiment; and FIG. 11 is a diagram showing a processing procedure for automatically creating a Web page according to the embodiment.

DETAILED DESCRIPTION

An embodiment of the present invention will be described.

The embodiment allows a user who has captured and recorded image data (files) based on moving images or still images using an image capturing apparatus such as a video camera or a digital still camera to create Web content using the image data (files).

Web content, as used herein, is also referred to as a Web site, and represents a unit of Web pages. Generally, Web content is stored in a server or the like on the Internet so that unspecified or specified terminals connected to the Internet can access the Web content. Further, Web content is generally described using a markup language such as Hyper Text Markup Language (HTML) or Extensible Markup Language (XML), and is viewed using a software application called a Web browser operable to interpret the data written in the markup language for reproduction.

Figure 1:
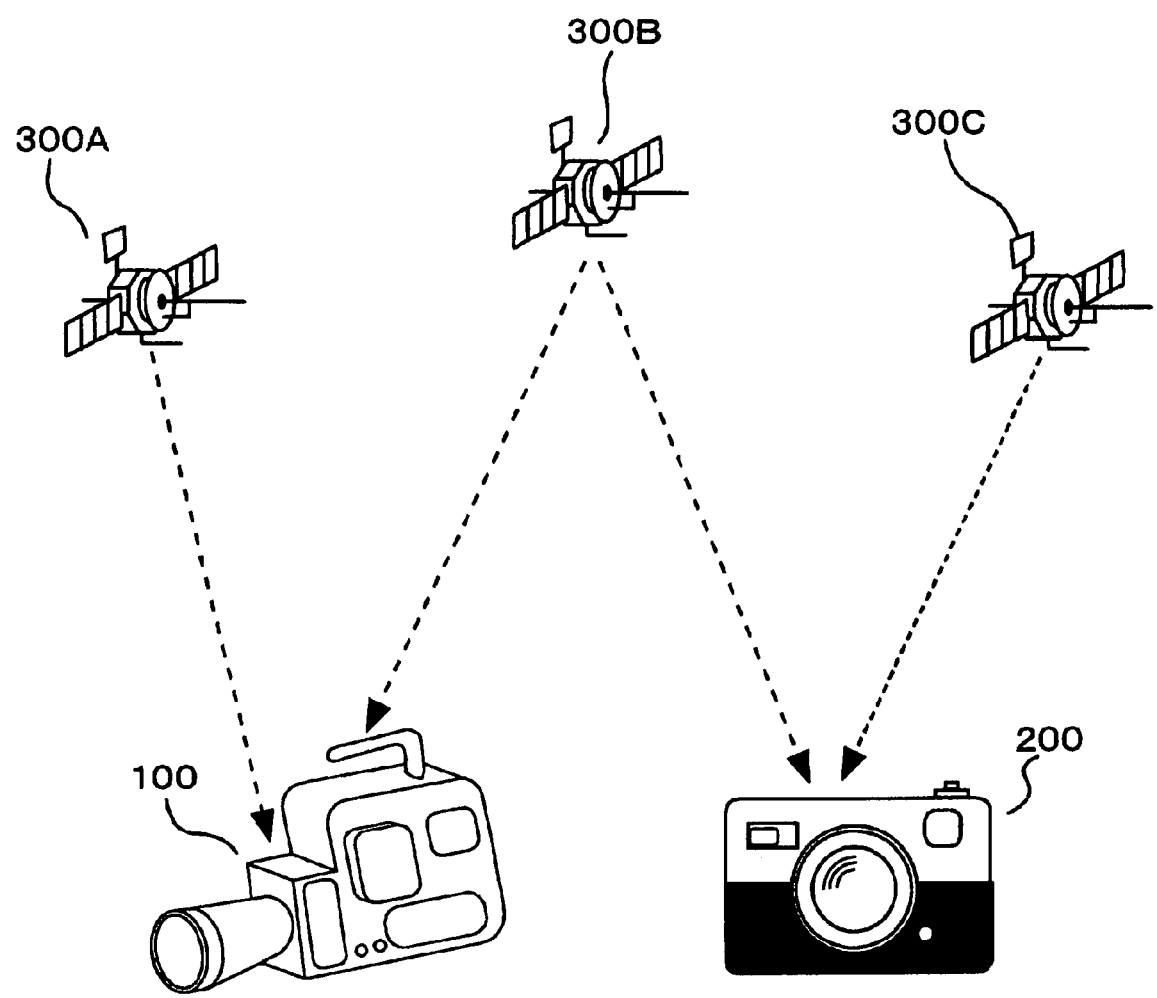
FIG. 1 is a schematic diagram of a system configuration including an image capturing apparatus according to an embodiment of the present invention and GPS satellites.

FIG. 1 shows a video camera 100 and a digital still camera 200 as image capturing apparatuses used by a user to capture images. Each of the video camera 100 and the digital still camera 200 includes a built-in GPS module. The GPS module is a component device capable of receiving radio waves from GPS satellites and performing positioning computation to obtain positioning information.

With the use of the built-in GPS modules, the video camera 100 and the digital still camera 200 can receive radio waves from a plurality of GPS satellites (300A, 300B, and 300C), and can perform positioning computation using a predetermined positioning method to obtain at least current position information as positioning information.

In the video camera 100 or the digital still camera 200, when the user performs an image capturing and recording operation, image data of moving images or still images obtained by the capturing operation is stored in a storage medium included therein or a removable storage medium placed therein, for example, on a file-by-file basis. Each of the files of the stored image data is added with, for example, metadata (additional information) having predetermined information items related to the image data. In the embodiment, the metadata includes the position information obtained by the GPS module.

Figure 2:
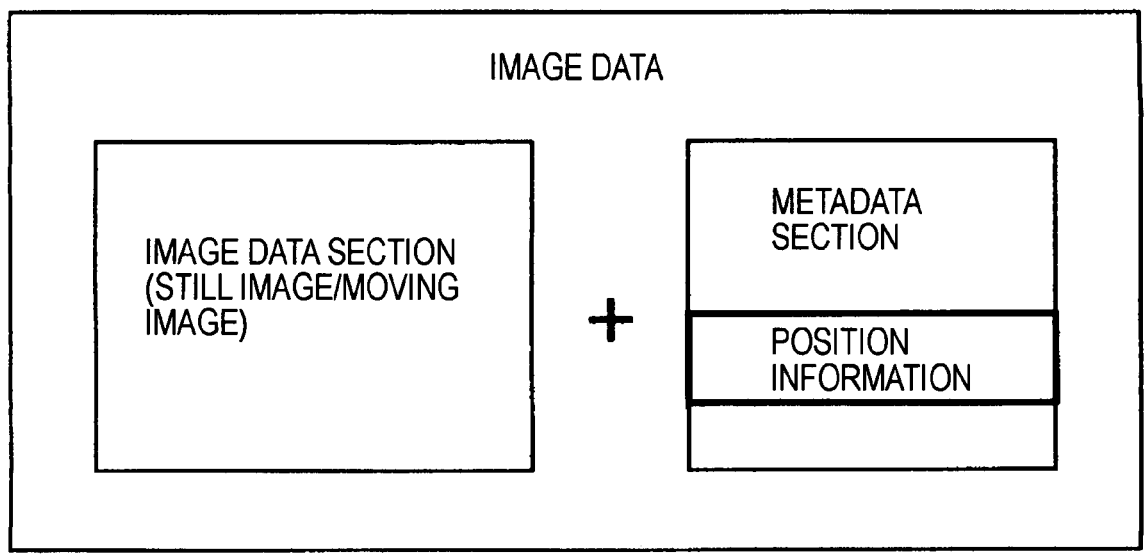
FIG. 2 is a schematic diagram showing an example structure of image data used in the embodiment.

For example, as shown in FIG. 2, an image data file is formed of an image data section including an image data entity as a still image or moving image, and a metadata section including predetermined information items related to the contents of the image data section. A region for storing position information is provided at a predetermined position of the metadata section. As described above, the position information stored in the region is obtained by the GPS module, and may indicate a position at which the image data was captured. The information other than position information, which is stored in the metadata section, includes the image capture date and time, the data (file) size, the resolution of the image data section, the data rate, the encoding method, and information on settings of various parameters such as the exposure and white balance during the image capturing process.

Figure 3:
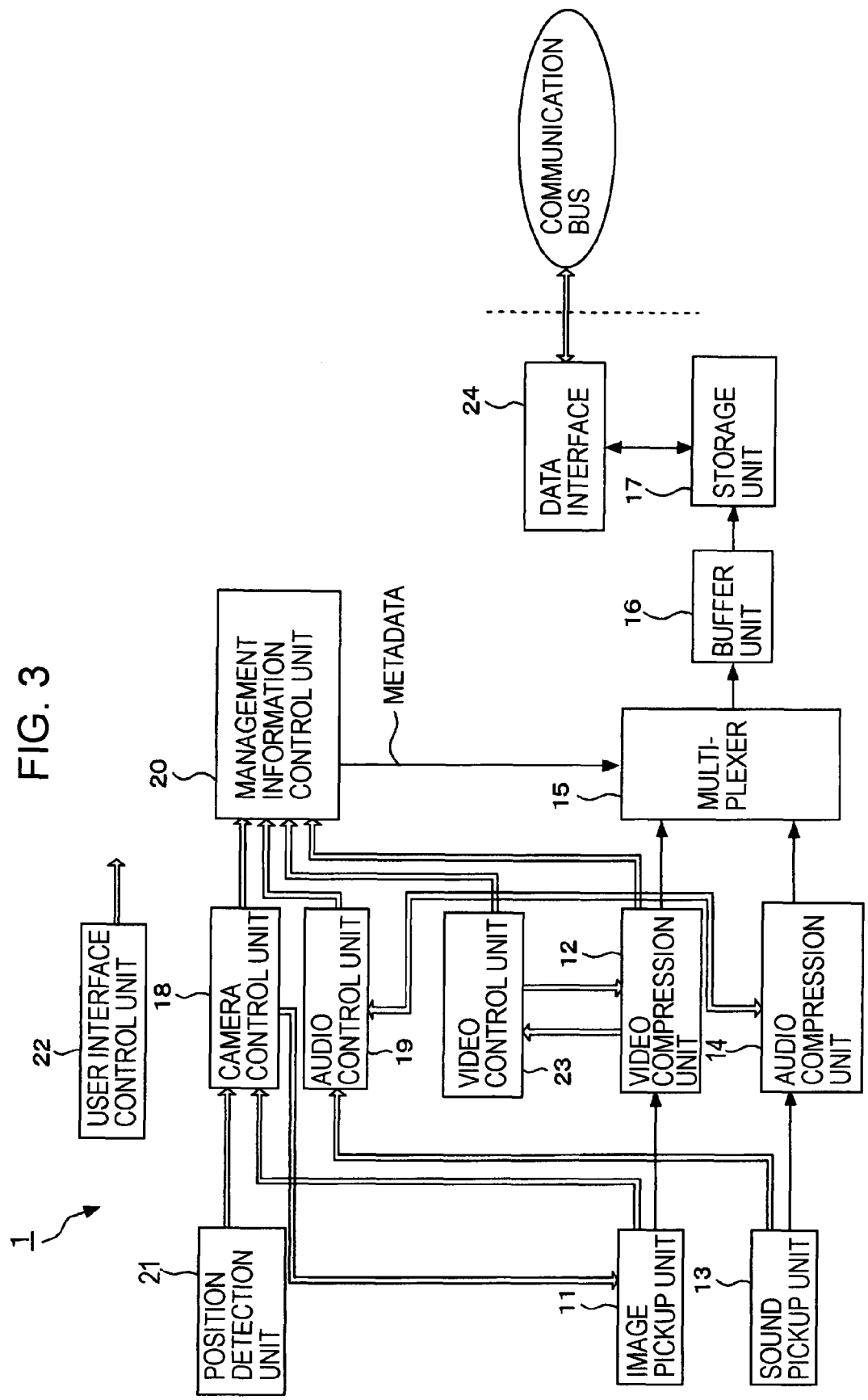
FIG. 3 is a schematic diagram showing an example of the image capturing apparatus according to the embodiment.

FIG. 3 shows an example structure of an image capturing apparatus 1 serving as the video camera 100 or the digital still camera 200, specifically showing a structure for recording a captured image. In FIG. 3, a solid arrow depicts the flow of information serving as user data to be written and stored in a recording medium (storage medium) in a storage unit, such as a video signal, an audio signal, or meta-information. A hollow arrow depicts the flow of information for various control operations.

The image capturing apparatus 1 shown in FIG. 3 includes an image pickup unit 11. The image pickup unit 11 includes an optical system (image pickup optical system), an image pickup device, and an image signal processing system for performing signal processing to be performed before compression coding. The optical system includes a lens unit formed of image pickup lenses, and an aperture stop. The lens unit includes a focus lens for adjusting the focus, and a zoom lens for adjusting the zoom (angle-of-view). The image pickup unit 11 is provided with a focus lens driving mechanism including a gear and a motor for moving the focus lens along the optical axis to adjust the focus. The image pickup unit 11 is also provided with a zoom lens driving mechanism including a gear and a motor for moving the zoom lens along the optical axis to adjust the zoom.

In the image pickup unit 11, image pickup light obtained by the optical system is focused onto a photoelectric conversion element unit provided in the image pickup device, and is converted into an electrical signal. Examples of photoelectric conversion elements include charge coupled device (CCD) elements and complementary metal-oxide semiconductor (CMOS) elements.

In the image pickup unit 11, the electrical signal output from the image pickup device is subjected to processing such as correlated double sampling (CDS) and automatic gain control (AGC), and is then converted into a digital signal, which is further subjected to predetermined image signal processing using digital signal processing. As the image signal processing, predetermined digital signal processing is performed, for example, a digital video signal corresponding to the captured image is obtained from the digital signal.

In the image pickup unit 11, predetermined signal processing is further performed, such as generation of predetermined control parameters used by a camera control unit 18 to perform camera control operations. The camera control operations performed by the camera control unit 18 include auto focus (AF) control, exposure control, white balance processing, and camera-shake correction. These camera control operations may be performed using known techniques.

The image capturing apparatus 1 of the embodiment further includes a position detection unit 21.

The position detection unit 21 is formed of devices including a global positioning system (GPS) module, and is configured to detect, for example, a current position. The detected position information is represented by latitude, longitude, and so forth. In the embodiment, the position information detected by the position detection unit 21 is input to the camera control unit 18.

In the embodiment, the obtained position information is used as additional information to be added to a file of captured image data to be stored in a storage unit 17, that is, the position information to be stored in the metadata section of the image data shown in FIG. 2. The position information may be used for other applications. The position detection unit 21 may have any other structure without including a GPS module, which is capable of obtaining information of a current position.

The digital video signal that is finally obtained by the image pickup unit 11 is input to a video compression unit 12. The video compression unit 12 performs compression coding on the input video signal according to a predetermined method. In the current state of the art, for moving images, a compression coding method for moving picture information, such as MPEG (Moving Picture Experts Group) 4, may be used. For still images, a still image compression coding method such as JPEG (Joint Photographic Experts Group) may be used.

As a result of the compression coding by the video compression unit 12, image data of the moving image or still image is obtained, and is then output to a multiplexer 15.

The image capturing apparatus 1 further includes a sound pickup unit 13. The sound pickup unit 13 includes a predetermined number of microphones for picking up sound to produce an audio signal, and an audio signal processing system for performing predetermined signal processing to be performed before compression coding on the audio signal obtained by the microphones. In the sound pickup unit 13, the audio signal is converted from analog to digital at a predetermined signal processing stage.

The digital audio signal output from the sound pickup unit 13 is output to an audio compression unit 14.

The audio compression unit 14 performs audio compression coding corresponding to the image compression coding performed by the video compression unit 12, and outputs the result to the multiplexer 15. In the case of moving-image recording, the video compression unit 12 and the audio compression processing unit 14 perform compression coding so that the so-called "lip sync" can be maintained, and output the compression-coded video signal (or compressed video data) and the compression-coded audio signal (or compressed audio data), respectively.

The camera control unit 18 is a section representing a collection of predetermined control functions for a camera unit in the image pickup unit 11, such as the above-described AF control and zoom control functions. The information obtained by the camera control unit 18, such as certain control results, is acquired by a metadata (management information) control unit 20, and is used to generate metadata.

A video control unit 23 performs various control operations so that the signal processing operation of the video compression unit 12 can correctly be performed. For example, the video control unit 23 acquires data from the video compression unit 12, performs various types of detection, such as motion detection, and computation for compression processing, and controls the signal processing operation of the video compression unit 12 according to the detection result and the computation result. The information obtained by the video control unit 23, such as a detection result or control result on a predetermined item, is acquired by the metadata control unit 20, and can be used to generate management information.

An audio control unit 19 controls the audio signal processing operation. That is, the audio control unit 19 is configured to control the signal processing operation of the audio compression processing unit 14 on the basis of predetermined information output according to, for example, a signal processing result of the sound pickup unit 13. The information obtained by the audio control unit 19, such as a certain control result, is also acquired by the metadata control unit 20, and can be used to generate metadata.

A user interface control unit 22 acquires operation information that is obtained by operating various operating elements provided for the image capturing apparatus 1, and processes the operation information so that the image capturing apparatus 1 can perform a correct operation in accordance with the operation. The user interface control unit 22 transmits operation information obtained by a predetermined operation to appropriate components in the illustrated functional units.

The metadata control unit 20 generates information (metadata) serving as the metadata section to be added to the image data, shown in FIG. 2 by way of example. As described above, in order to generates management information, the metadata control unit 20 uses the information output from the camera control unit 18, the audio control unit 19, the video compression unit 12, and the like, such as predetermined control information and detection results, and collects and generates various information items of metadata including the position information detected by the position detection unit 21 and the image capture date and time. Then, the metadata control unit 20 stores the information items in a predetermined data structure to obtain information units as metadata.

The compression-coded image data as the moving image or still image (in the case of moving-image recording, also the compressed audio data) and the information of metadata are input to the multiplexer 15. The multiplexer 15 performs predetermined processing such as multiplexing and combination on the compression-coded image data of the moving image or still image and the metadata to generate image data having the data structure shown in FIG. 2, which is composed of an image data section and a metadata section. The generated image data is subjected to processing such as recording encoding in the recording format of the storage unit 17 to generate recording data, and the recording data is transferred to and accumulated in a buffer unit 16.

The buffer unit 16 transfers a predetermined amount of accumulated recording data to the storage unit 17 for writing. By sequentially recording data in the manner described above, for example, the image data shown in FIG. 2 is recorded.

Specifically, the storage unit 17 includes a predetermined recording medium (storage medium), and a drive capable of data recording (and reproduction) compatible with the recording medium. The recording medium may be a removable medium or a medium fixedly mounted together with the drive, such as a hard disk drive (HDD).

If the storage unit 17 is a digital versatile disc (DVD), the recording format of the storage unit 17 employs the so-called DVD format, such as DVD-Video or DVD-VR (Video Recording).

A data interface 24 is configured by implementing hardware and software for communicating with an external device using a predetermined data communication method to perform communication between the image capturing apparatus 1 and the external device. The data communication method supported by the communication unit is not particularly limited regardless of wired or wireless communication, and the number of supported data communication methods is not limited. Currently available examples of the data communication methods may include data bus standards for wired communication, such as USB (Universal Serial Bus), IEEE1394, and SCSI (Small Computer System Interface), and inter-device near field communication standards for wireless communication, such as Bluetooth™. In the embodiment, the data communication using the data interface 24 allows the image data files stored in the storage unit 17 to be transmitted to the outside via a communication bus.

The structure shown in FIG. 3 is represented by blocks indicating the image (and sound) recording functions of an image capturing apparatus, and is different from the actual hardware structure. In effect, the image capturing apparatus includes a section operable to capture an image using an image pickup device and the like, a section operable to pick up sound using a microphone and the like, a processor operable to convert video and audio signals obtained by those sections into digital signals and to perform predetermined processing such as digital signal processing, coding, and multiplexing, a drive corresponding to a predetermined recording medium, and a microcomputer or the like including a central processing unit (CPU), a read-only memory (ROM), and a random access memory (RAM) and operable to perform various predetermined control operations.

As described above, in the embodiment, once a user captures an image using an image capturing apparatus, image data with metadata including position information can be recorded. It is assumed that the user desires to create (or update) the user's blog, which is publicly released on the Internet, using the image data captured and recorded by the user using the image capturing apparatus.

As is well known in the art, etymologically, "blog" is short for "Web log", and is a piece of Web content or a Web site. General Web sites, or so-called homepages, include a homepage and a link page, and have been known prior to the advent of blogs. In order to make a Web site publicly accessible on the Internet, first, a Web site author creates and edits a group of Web pages on a personal computer used by the author, and uploads the created data to a server or the like. In this case, a heavy load is placed on the author, such as the need for knowledge of a markup language such as HTML or the need to purchase and use software for creating a homepage.

On the other hand, blogs are one type of Web site, and have become increasingly widespread because of the light load on blog authors. Blogs are generally stored in a server so as to be managed in a database system. A blog author can access the server using a Web browser or the like, and can retrieve his/her blog for creation or editing. In general, several kinds of blog form are available, and editing is performed using blog form. The created or updated blog is stored again in the server. Therefore, there is no need for special software to create or edit blogs, unlike homepages, and writing in blog form is the most common, which is much easier than editing an HTML document. When another visitor accesses the blog via a Web browser or the like, actually, the visitor loads the blog data from the database of the server, and displays it on, for example, the Web browser.

Figure 4:
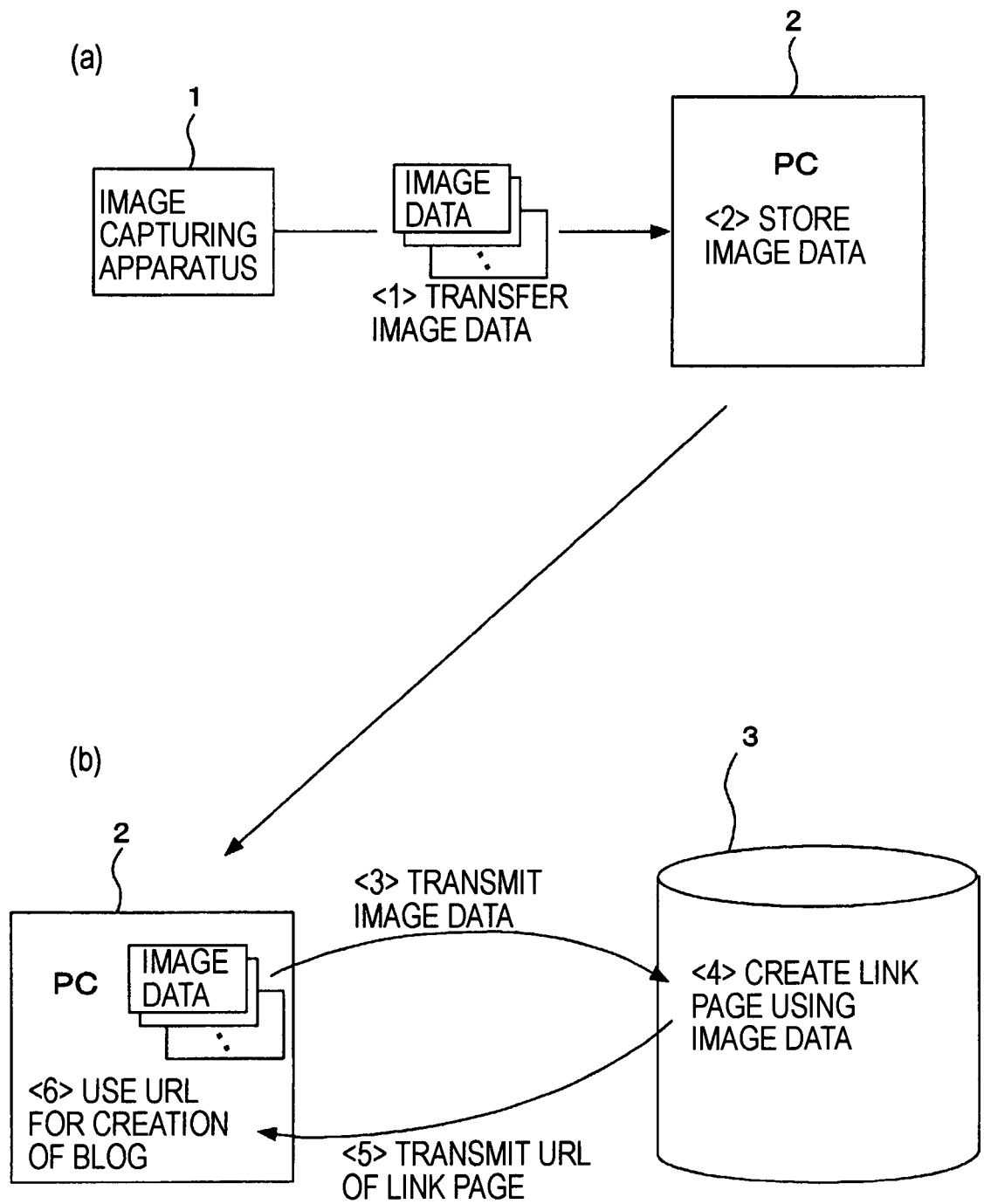
FIG. 4 is a schematic diagram showing a procedure performed between apparatuses to automatically create a link page of a blog according to the embodiment.

An operation for the user of the image capturing apparatus 1 to create a blog, and the flow of the operation of the apparatus and system will be described with reference to FIGS. 4 to 5B. In FIG. 4, the description will be given according to the procedure numbers within square brackets.

It is assumed that the user uses a personal computer (PC) to create a blog. In procedure 1 shown in (a) of FIG. 4, the user selects a piece of image data (file) to be used for creating the blog from among the pieces of image data (files) stored in the storage unit 17 of the image capturing apparatus 1, and transfers the selected piece of image data to a PC 2 used for creation of the blog. In the image capturing apparatus 1 shown in FIG. 3, for example, the data communication using the data interface 24 may be used to transfer the image data. In procedure 2, upon receiving the transferred image data, the PC 2 stores the image data in a storage device such as an internal HDD. If the storage unit 17 of the image capturing apparatus 1 is a removable recording medium, the recording medium may be removed from the image capturing apparatus 1, and may be placed in a recording medium drive provided for the PC 2 or connected to the PC 2 so that the image data can be read by the PC 2.

In a state where the image data recorded by the image capturing apparatus 1 can be processed by the PC 2, the user operates the PC 2 to edit the blog. The PC 2 is connected to a blog server 3 via a network such as the Internet. The blog server 3 is a blog management server. Upon receiving a blog editing request from the PC 2, the blog server 3 reads the editing form of the designated blog, and transfers the form to the PC 2. The editing form of the blog is displayed in the screen of the Web browser on a display of the PC 2 so that the user can perform a desired editing or updating operation on the editing form.

For example, it is assumed that the user creates a blog relating to real estate. The user desires to create a page for introducing pieces of real estate located in a certain area. In order to create the page, in procedure 3 shown in (b) of FIG. 4, the user transmits and uploads image data obtained by capturing images of the pieces of real estate to be introduced to the blog server 3. This operation is also performed using the Web browser.

In procedure 4, upon receiving the uploaded image data, the blog server 3 creates a page using the image data. The page created by the blog server 3 is a link page represented by links contained in the main body of the blog. The link page is created by, first, referring to the position information stored in the metadata section of the image data. The blog server 3 retrieves a map image portion of an area including a point represented by the referred position information from map information stored in the blog server 3, and pastes the image contents of the transferred image data so that the map image portion is used as a background of a new page to be created. That is, the image contents are pasted at a position on the map image represented by the position information of the image data. Therefore, a link page is automatically created using the data of the map image portion retrieved on the basis of the position information and the transmitted image data (the contents of the image data section) as raw material.

Figure 5B:
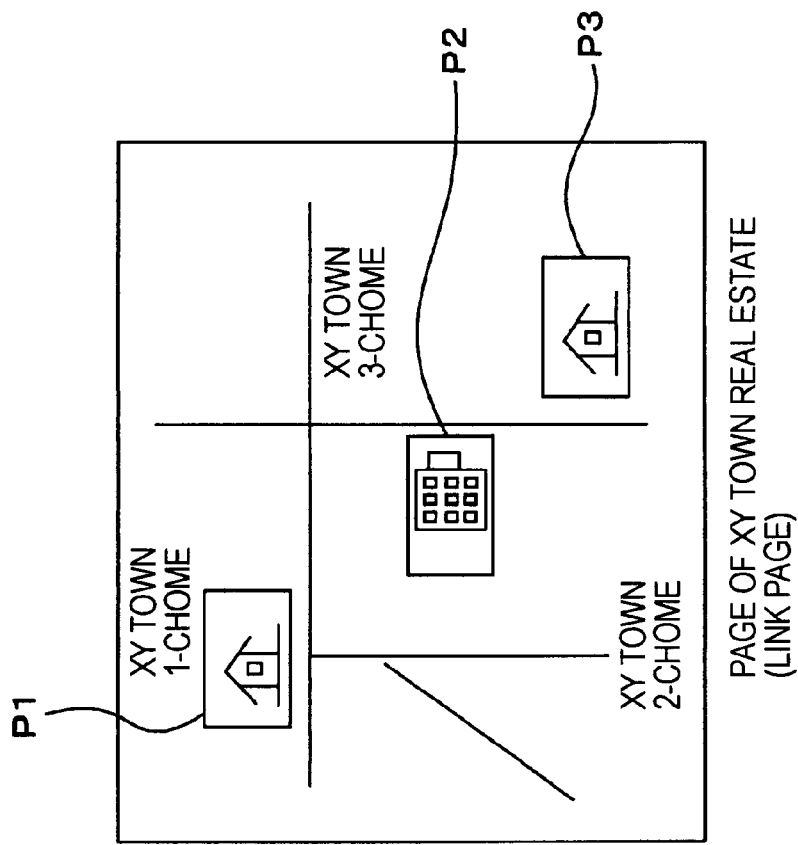
FIGS. 5A and 5B are diagrams showing an example of a blog created according to the embodiment.

FIG. 5B shows an example image of the page automatically created in the manner described above. In FIG. 5B, photograph images P1, P2, and P3 are pasted into a map image of an area covering XY Town 1-chome, XY Town 2-chome, and XY Town 3-chome. That is, in FIG. 5B, the image data captured and recorded using the image capturing apparatus 1, received by the PC 2, and transmitted to the blog server 3 is composed of three pieces of image data having the image contents of image data sections corresponding to the photograph images P1, P2, and P3. The three pieces of image data have position information representing a point at XY Town 1-chome, a point at XY Town 2-chome, and a point at XY Town 3-chome. Accordingly, the blog server 3 retrieves a map image covering an area around XY Town 1-chome, XY Town 2-chome, and XY Town 3-chome from the map information, and pastes the images corresponding to the respective pieces of image data into the map image at the positions corresponding to the position information.

In the embodiment, when the blog server 3 creates a link page in the manner described above, an address of a link destination linked from this page is also configured. The address may be, for example, a URL (Uniform Resource Locator) indicating a location in which the link page is stored on the blog server 3. After the blog server 3 stores and registers the data of the created link page so as to be managed by the blog server 3 itself, in procedure 5 shown in (b) of FIG. 4, the blog server 3 transmits the URL (address) of the link page to the PC 2. The user operating the PC 2 for blog editing performs editing so that the transmitted link can be provided at the corresponding position in the main body of the blog.

Figure 5A:
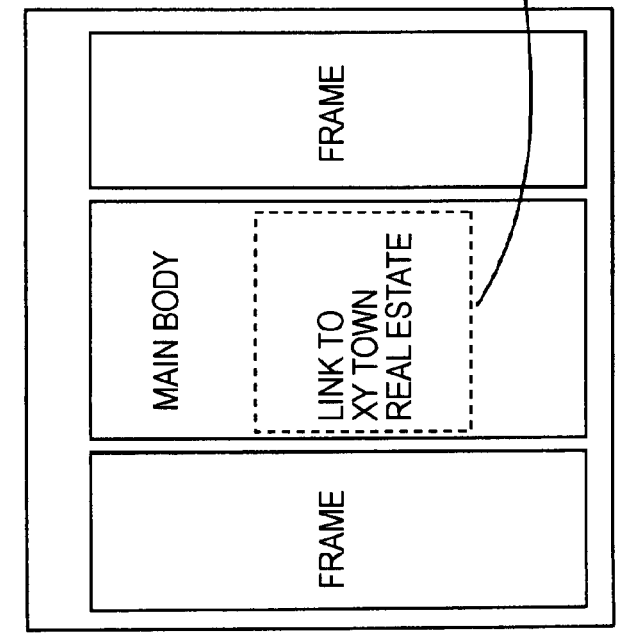

When the edited blog is viewed using the Web browser, the blog is displayed in a manner shown in, for example, FIGS. 5A and 5B. FIG. 5A shows a main page in which the main body of the blog is displayed. The main page is divided into three fields, i.e., a main body field at the center and frame fields at the right and left, although this is merely an example.

The main page actually includes a link to the link page shown in FIG. 5B (which is a page of XY Town real estate) at a predetermined text portion of the main body. When the link is clicked, the Web browser issues a request for the information of the link destination. In response to the request, the content data of the link page is returned from the blog server 3. The Web browser displays the image shown in FIG. 5B using the data.

While the description with reference to FIGS. 4 to 5B has been made in the context of blog creation, the automatic creation of content according to the embodiment can also be applied to the creation of general Web content called a homepage. An example of this application will be described with reference to FIGS. 6 to 7B.

It is assumed that the user desires to create a Web page of a travel report using image data captured during traveling. Also in this case, in procedures 1 and 2 shown in (a) of FIG. 6, the user transfers image data selected for creating the Web page from the image capturing apparatus 1 to the PC 2, and stores the data in the PC 2.

The PC 2 is connected to a Web content creation server 3A via the Internet in order to create Web content. As described above, initially, Web content such as a homepage is created by a local personal computer using a software application for creating a homepage or using a description in a markup language. In this case, however, the Web content creation server 3A provides a service for helping create a Web page, and the user uses the service from the Web content creation server 3A in the Web content creation process to create Web content.

Figure 6:
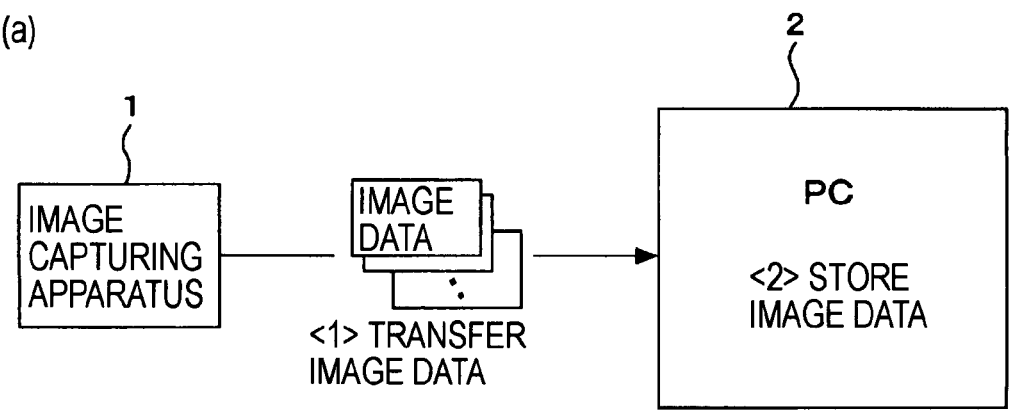
FIG. 6 is a schematic diagram showing a procedure performed between apparatuses to automatically create a Web page according to the embodiment.
Figure 6:
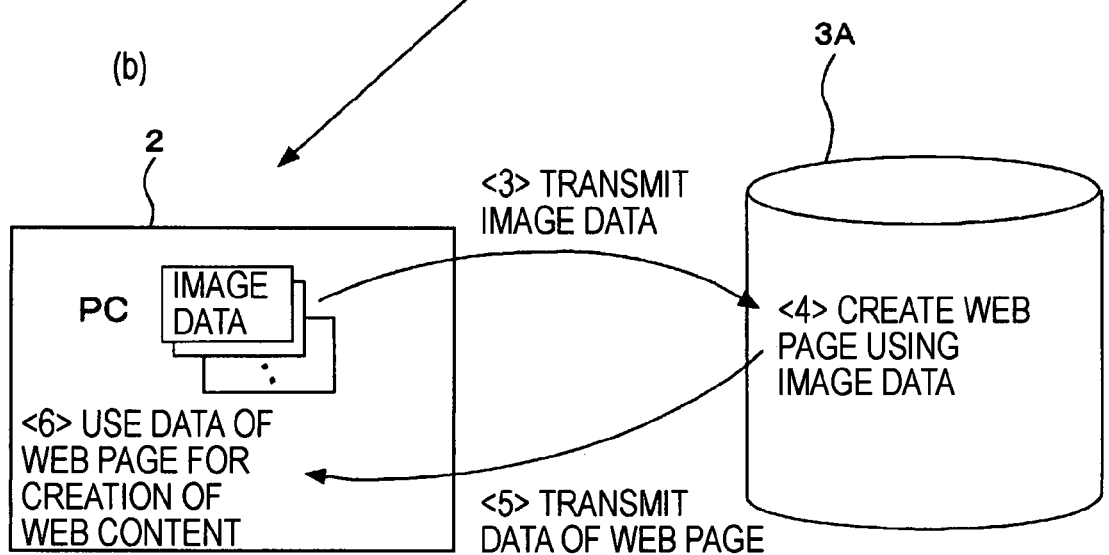

In procedure 3 shown in (b) of FIG. 6, the user transmits image data used for creating the Web page to the Web content creation server 3A via the Internet. Upon receiving the image data, the Web content creation server 3A creates Web pages shown in, for example, FIGS. 7A and 7B.

Figure 7A:
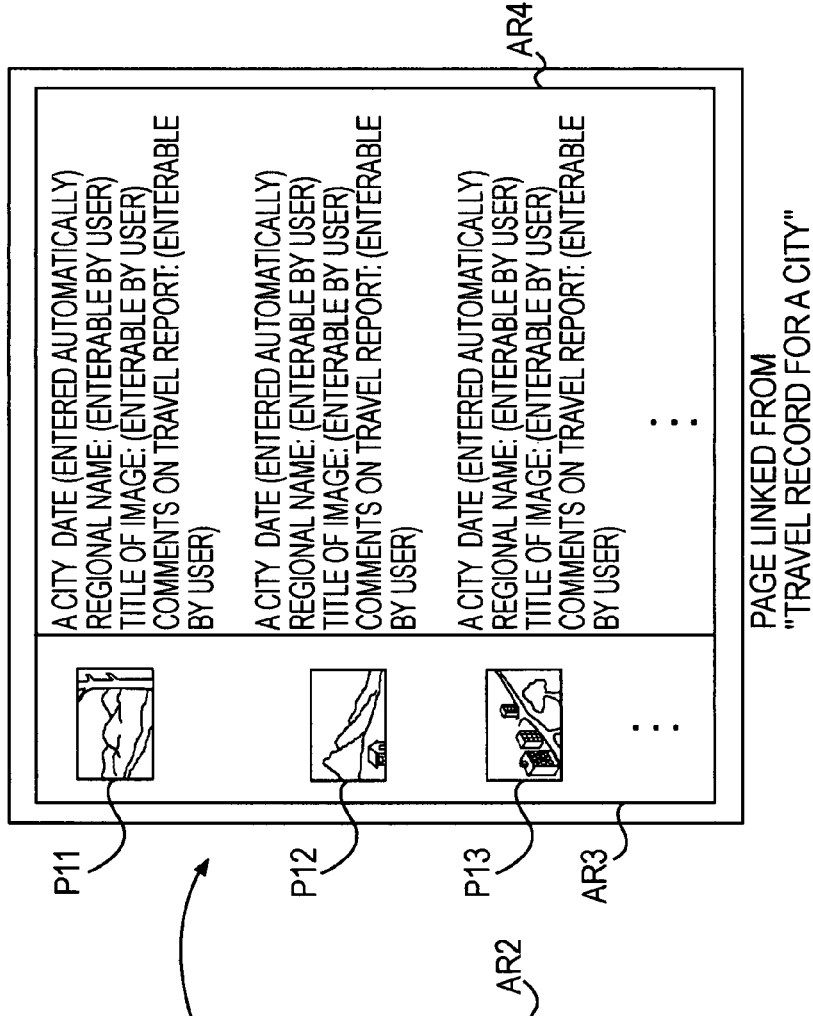
FIGS. 7A and 7B are diagrams showing an example of a Web page created according to the embodiment.

FIG. 7A shows an example display style of a main page of a travel report. The main page includes a left image area AR1, and a right image area AR2. In the image area AR1, a map covering the entirety of a certain region is shown, and the map includes points indicating the locations of A City, B City, C City, and D City. The image area AR2 includes the title, namely, "Travel Report Table of Contents", followed by headings "Travel Record for A City", "Travel Record for B City", "Travel Record for C City", and "Travel Record for D City". These headings are underlined, which indicates that each of the headings contains a link.

For example, the main page shown in FIG. 7A is actually displayed using a Web browser. When the heading "Travel Record for A City" is clicked, a link page shown in FIG. 7B is loaded and displayed.

Figure 7B:
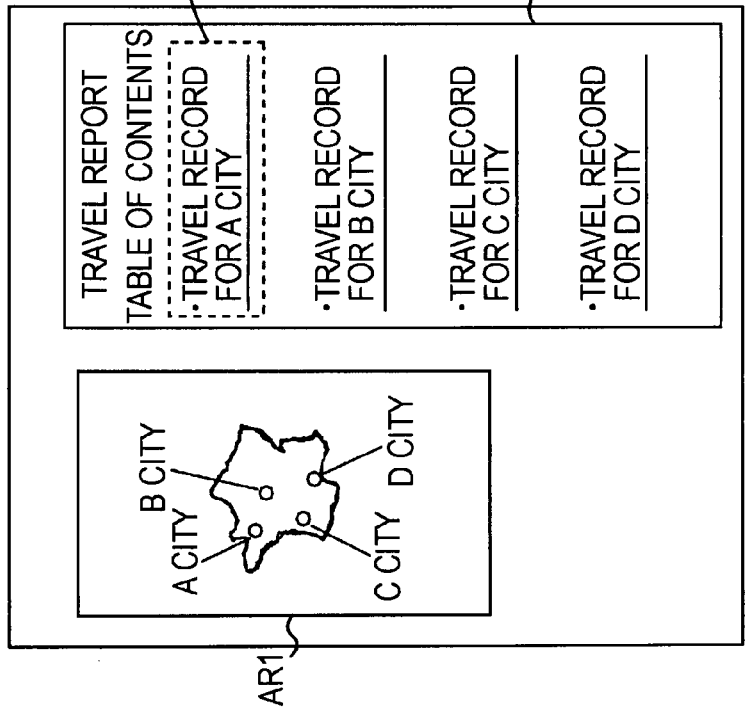

The link page shown in FIG. 7B includes a left image area AR3, and a right image area AR4. In the image area AR3, thumbnails of images P11, P12, P13, . . . of image data that were captured at A City are displayed. In the image area AR4, a comment field for each of the images P11, P12, P13, . . . displayed in the image area AR3 is displayed. In the comment fields, characters to be entered in entries such as "Regional Name", "Title of Image", and "Comments on Travel Report", can be entered by operating the PC 2 after the data of the Web page has been loaded into the PC 2.

In the correspondence between the pages shown in FIGS. 7A and 7B, the user transmits a desired number of pieces of image data, which have been captured at A City, B City, C City, and D City, to the Web content creation server 3A. The Web content creation server 3A collects pieces of position information for all the pieces of transmitted image data, and refers to map information to designate, first, a regional unit including these pieces of position information. For example, if A City, B City, C City, and D City are five regions located in France, the land as France in Europe is designated as the regional unit. A map image of France is retrieved from the map information, and is used as a map image to be displayed in the image area AR1 shown in FIG. 7A. Further, it is also recognized from the map information that the collected pieces of position information correspond to A City, B City, C City, and D City in France, and the signs indicating A City, B City, C City, and D City are added to the map image in the image area AR1 according to the recognition result. In the image areas AR1, AR2, and AR4 shown in FIG. 7A, the characters "A City", "B City", "C City", and "D City" represent actual regional names or the like registered in the map information.

Since it is recognized that the collected pieces of position information correspond to A City, B City, C City, and D City in France, the headings in the image area AR2 shown in FIG. 7A can be produced by, for example, entering characters "A City", "B City", "C City", or "D City" in a template character string such as "Travel Record for xx". A link contained in each of the heading character strings can also be created using the directory of a storage destination designated for the corresponding link page (which is preferably represented by a relative path with respect to the homepage).

The image area AR3 of the link page shown in FIG. 7B can be created by producing thumbnail images using the image data sections of the transmitted pieces of image data and pasting the thumbnail images. The image area AR4 may be included in the link page by, for example, using predetermined form for allowing the display style shown in FIG. 7B.

As can be understood from the foregoing description, in the embodiment, once a user who is an author of Web content, such as a blog or a Web page, transmits image data whose image contents are used in the Web content to be created to the blog server 3 or the Web content creation server 3A, a blog link page or a Web page can be automatically created. In particular, in the automatic creation of Web content in the blog server 3 or the Web content creation server 3A, for example, the position information of the transmitted image data is used to retrieve map information or present a regional name to be introduced. In the embodiment, therefore, the position information added to the image data can be effectively used to automatically create Web content (content information) having the corresponding contents, thus reducing the load on the author (or user) to create the Web content.

A technical structure for realizing the creation of Web content according to the embodiment described with reference to FIGS. 4 to 6 will be described.

First, an example structure of the personal computer (PC) 2 will be described with reference to FIG. 8.

Figure 8:
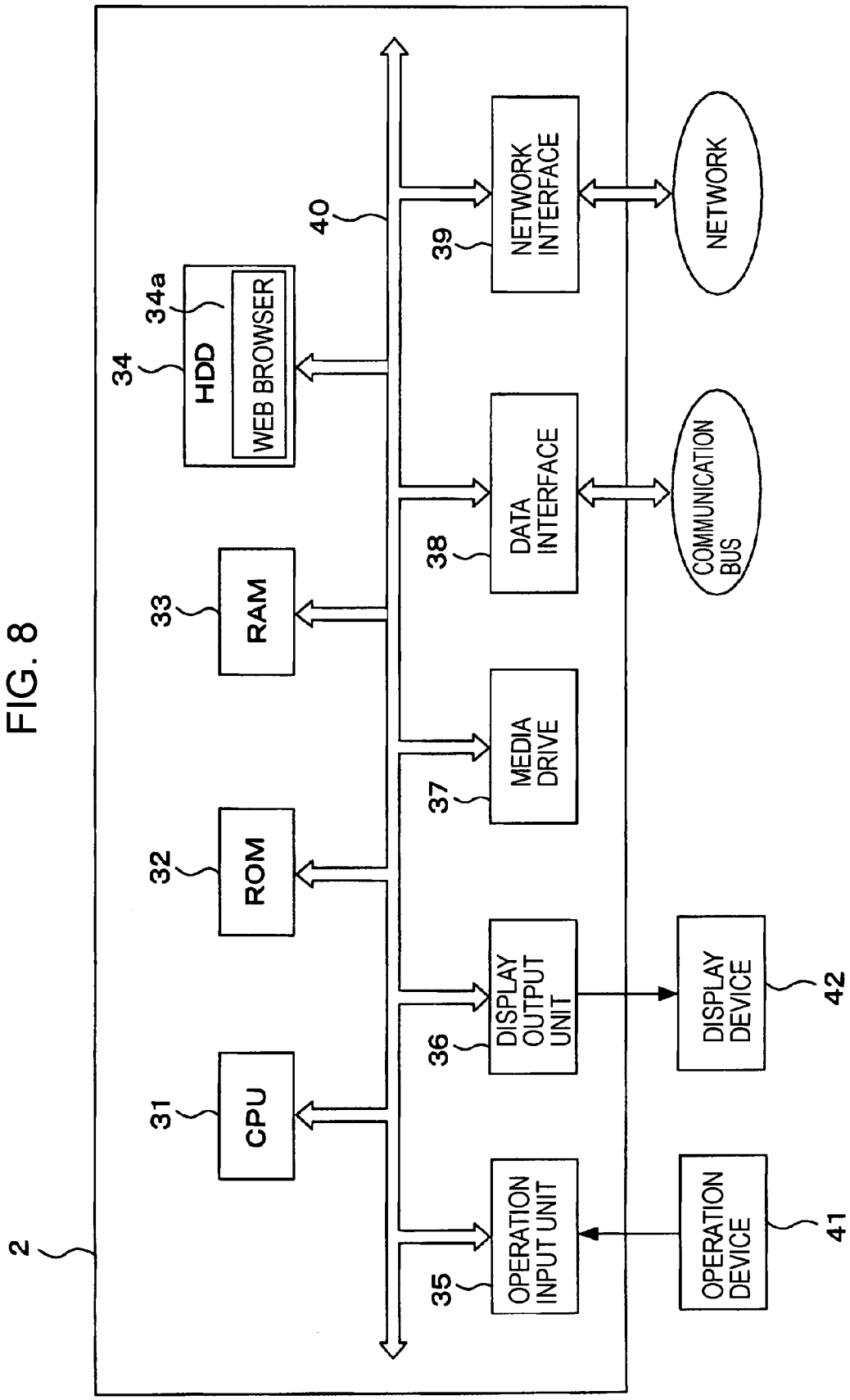
FIG. 8 is a diagram showing an example structure of a personal computer (PC) according to the embodiment.

The PC 2 shown in FIG. 8 includes a CPU 31, a ROM 32, a RAM 33, a hard disk drive (HDD) 34, an operation input unit 35, a display output unit 36, a media drive 37, a data interface 38, and a network interface 39, which are connected with one another via an internal bus 40.

The CPU 31 loads programs, such as a program stored in the ROM 32 and an application program stored in the HDD 34, into the RAM 13 for execution. The RAM 33 also stores data and the like necessary for the CPU 31 to perform various types of processing, if necessary. The ROM 32 is generally unwritable, but may be a memory including a non-volatile writable memory device, such as a flash memory.

The HDD 34 serves as an auxiliary storage device in the PC 2, and stores the various programs executed by the CPU 31 by installing the programs therein. The HDD 34 also stores various application files and the like. The data stored in the HDD 34 is managed by a file system or the like. The CPU 31 can use the file system to write or read data to or from the HDD 34.

In FIG. 8, a Web browser 34a is illustrated among the programs installed in the HDD 34. The Web browser 34a is a software application for displaying a Web site uploaded and publicly accessible via the Internet or a locally stored document written in a markup language such as HTML and allowing the user to browse and use the Web site or the document. As can be understood from the foregoing description, in the embodiment, the Web browser 34a is used to access the blog server 3 or the Web content creation server 3A via the Internet for creation of Web content.

Upon receiving a signal corresponding to an operation output from an operation device 41, the operation input unit 35 converts the received signal into an instruction that can be processed by the CPU 31, and outputs the instruction to the CPU 31. The CPU 31 executes processing in accordance with the instruction. The operation device 41 is a collection of various operation input devices for allowing a user to operate a computer, such as a mouse and a keyboard.

The display output unit 36 executes processing for displaying an image using a display device 42, for example, according to the control of the CPU 31.

The media drive 37 allows data read/write according to designated media such as, in the current state of the art, CD-ROMS, DVDS, and removable semiconductor memory elements compatible with predetermined standards. The media drive 37 is also controlled by the CPU 31.

The data interface 38 is configured by implementing hardware and software for communicating with an external device using a predetermined data communication method to perform communication between the PC 2 and the external device. In this case, for example, the data interface 38 has a configuration capable of communicating with the data interface 24 of the image capturing apparatus 1.

The network interface 39 is configured to realize an interface function for performing communication via a network such as the Internet or a local area network (LAN), and is compliant with a standard such as, in the current state of the art, Ethernet™ or a wireless LAN standard, e.g., IEEE 802.11a/b/g. If the network interface 39 is connected to the Internet using a telephone line, the network interface 39 may include a modem.

Figure 9:
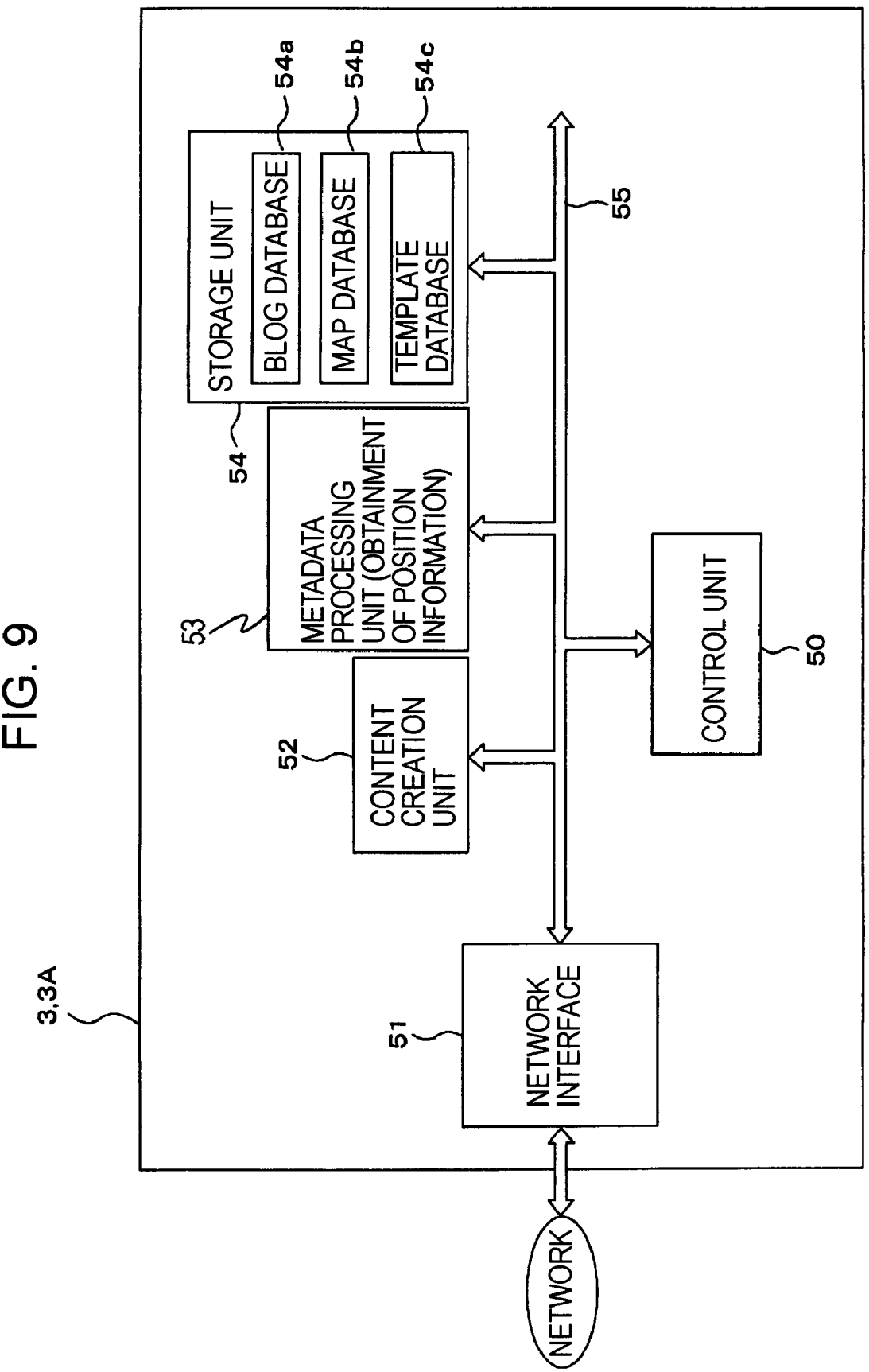
FIG. 9 is a diagram showing an example structure of a blog server and a Web content creation server according to the embodiment.

FIG. 9 shows an example structure of the blog server 3 and the Web content creation server 3A. In the following description, the blog server 3 and the Web content creation server 3A will be collectively referred to as a "server" unless individually identified.

In FIG. 9, the server 3 or 3A includes a control unit 50, a network interface 51, a content creation unit 52, a metadata processing unit 53, and a storage unit 54, which are connected with one another via an internal bus 55.

The control unit 50 includes, for example, a CPU, a RAM, and a ROM, and executes a program stored in the internal ROM or the storage unit 54 to perform the control operation of the server 3 or 3A.

The network interface 51 is configured to realize an interface function for performing communication via a network such as the Internet or a LAN. The server 3 or 3A is connected using the network interface 51 via the Internet to a terminal to which the server 3 or 3A provides a service.

In the blog server 3, the content creation unit 52 is configured to perform various types of processing for creating Web content such as the blog described above with reference to FIGS. 5A and 5B. In the Web content creation server 3A, the content creation unit 52 is configured to perform various types of processing for creating the Web page described above with reference to FIGS. 7A and 7B. That is, the automatic creation of Web content according to the embodiment is implemented by the content creation unit 52.

The function of the content creation unit 52 is implemented by, for example, actually, executing a program in accordance with the function of the content creation unit 52 by the CPU in the control unit 50 and using the hardware resources of the server 3 or 3A, such as a memory and a signal processing circuit.

The metadata processing unit 53 is configured to perform processing for the metadata added to the image data, such as analysis and recognition of the contents of the metadata. As described above, the metadata processing unit 53 obtains the position information added as a part of the metadata to the image data.

The function of the metadata processing unit 53 is also implemented by, actually, executing a program in accordance with the function of the metadata processing unit 53 by the CPU in the control unit 50 and using the hardware resources of the server 3 or 3A, such as a memory and a signal processing unit.

The storage unit 54 actually includes, for example, an HDD, and stores various types of information and data necessary for the operation of the server 3 or 3A, such as creation of Web content. In FIG. 9, the storage unit 54 includes a blog database 54a, a map database 54b, and a template database 54c.

The blog database 54a is a resource of information stored in the case of the blog server 3, and is a database of pieces of content information as blogs that are created using blog services provided by the blog server 3 and that are to be publicly available on the Internet.

For example, a request for viewing a designated blog stored in the blog database 54a is transmitted from a terminal on the Internet. The request is received by the network interface 51, and is transferred to the control unit 50. The control unit 50 reads the information of the designated blog from the blog database 54a of the storage unit 54 to establish a Web page, and transmits data of the Web page from the network interface 51 to the requesting terminal via the Internet. The terminal receives the transmitted data of the Web page, and displays the Web page using, for example, a Web browser application.

The map database 54b is a database of pieces of map information. The map information has a basic structure in which, first, position information represented by latitude and longitude is associated with an image as a map. In addition, for example, the names of places, addresses, and other additional information are associated with the position information.

The template database 54c is a database of pieces of template (model) data for the blog pages shown in FIGS. 5A and 5B and the Web pages shown in FIGS. 7A and 7B. The pieces of template data, which link pages of blogs or Web pages are based on, are created on the basis of document files described in a predetermined markup language such as HTML. For example, a basic description has been already filled by default in the link page shown in FIG. 5B or the Web pages shown in FIGS. 7A and 7B. When one of the templates is actually used to create a link page or a Web page, the default description contents in the template are updated according to an image to be laid out or a change in the character strings.

Although not shown, the storage unit 54 can further store programs necessary for the operation of the server 3 or 3A. For example, in actual use, a program for an operating system (OS) and application programs running on the OS are stored. The application programs may include programs corresponding to the functions of the content creation unit 52 and the metadata processing unit 53.

FIG. 10 shows a processing procedure performed by the PC 2 and the blog server 3 for automatically creating the link page of the blog shown in FIGS. 4 to 5B. The procedure shown in FIG. 10 is performed in an environment where the user has already transferred image data from the image capturing apparatus 1 to the PC 2 in order to update the blog, as shown in (a) of FIG. 4, and the Web browser 34a has been already activated to connect the PC 2 to the blog server 3 via the Internet in order to edit the blog.

In FIG. 10, a user interface and a Web browser are illustrated in the PC 2, and content creation processing, metadata processing, and a map database (database) are illustrated in the blog server 3. The user interface in the PC 2 corresponds to the operation input unit 35. The Web browser of the PC 2 is stored in the HDD 34, and corresponds to the Web browser 34a that has already been activated and that is executed by the CPU 31. The content processing, the metadata processing, and the map database in the blog server 3 correspond to the content creation unit 52, the metadata processing unit 53, and the map database 54b shown in FIG. 9, respectively.

As described above with reference to (b) of FIG. 4, in order to automatically create a link page, image data used for the link page is transferred from the PC 2 to the blog server 3. Thus, for example, the user performs an operation for the PC 2 on the screen of the Web browser to specify image data to be transferred, and transmits the specified image data to the blog server 3. Accordingly, in step S101 shown in FIG. 10, the PC 2 issues an instruction from the user interface to the Web application to transmit the specified image data to the blog server 3. In step S102, the Web server reads the specified image data, and transmits the image data to the blog server 3 via the Internet. In the example shown in FIGS. 5A and 5B, the pieces of image data corresponding to the photograph images P1, P2, and P3 are transmitted.

Upon receiving the transmitted image data, the blog server 3 passes the received image data to the content creation unit 52. Upon passing the image data, in step S103, the content creation unit 52 issues a metadata processing request to the metadata processing unit 53. For example, the content creation unit 52 extracts and obtains the metadata section from each of the passed pieces of image data, and passes the information of the metadata sections to the metadata processing unit 53.

Upon receiving the metadata processing request, in step S104, the metadata processing unit 53 performs processing on the desired metadata, such as retrieving and obtaining a necessary metadata item from the information of the metadata sections of the pieces of image data received together with the request. In order to create the link page, in the metadata processing of step S104, the position information is extracted and obtained. In step S105, the obtained position information corresponding to each of the pieces of image data is transferred to the content creation unit 52 in response to the request in step S103.

Upon receiving the transferred position information, in step S106, the content creation unit 52 searches the map database 54b for the position information of each of the passed pieces of image data as a search key. As a result of the search, an area range including all the pieces of position information used as the search keys is specified. When a search result is obtained in the manner described above, in step S107, the content creation unit 52 reads and receives the data of the area range obtained as the search result from the map database 54b.

In the current stage, the content creation unit 52 has stored the image data passed in step S102 and the data of the area range received in step S107. In step S108, the content creation unit 52 creates a link page using the stored information as material.

The link page creation process will be described in the context of the link page shown in FIG. 5B, by way of example. First, the content creation unit 52 reads, from the template database 54c of the storage unit 54, template data that the creation of a link page having a display style in which a thumbnail image is pasted onto a map image is based on. The template data, which the link page is based on, has been created on the basis of a document file described in a predetermined markup language such as HTML.

The content creation unit 52 retrieves the data of the map image as data of the area range read from the map database 53c. The positions on the map image data matching the pieces of position information of the image data corresponding to the photograph images P1, P2, and P3 are designated as, for example, pixel positions of the map image data. Since the map image data also includes the position information represented by, for example, latitude/longitude, the position information of the image data is matched with the position information of the map image data to thereby designate a position on the map image matching the position information of the image data on the basis of the position information. By replacing the position information by the data of the pixel positions of the map image data, the positions on the map image matching the pieces of position information of the image data can be obtained as the pixel positions of the map image data.

Then, the content creation unit 52 performs writing in the template so as to lay out the map image data as a background image. Further, the display positions of the image data corresponding to the photograph images P1, P2, and P3 as objects are determined on the basis of the designated pixel positions of the map image data, and are written in the template. Therefore, a link page is created.

Also in step S108, the created link page is stored in the storage unit 54 so as to be registered in the blog database 54a.

When the created link page is stored, the address (URL) of the link page is determined. In step S109, the content creation unit 52 transmits the link destination URL of the link page to the Web browser of the PC 2 via the Internet.

Although not shown in FIG. 10, upon receiving the URL of the link page, the Web browser presents the URL to the user in a predetermined style. The user edits the main body of the blog using the Web browser to insert a link into the main body using the presented URL.

A processing procedure performed by the PC 2 and the Web content creation server 3A for automatically creating the Web pages shown in FIGS. 6 to 7B will be described with reference to FIG. 11. The procedure shown in FIG. 11 is performed in an environment where the user has already transferred image data from the image capturing apparatus 1 to the PC 2 in order to create and update a Web page serving as Web content, such as a homepage, as shown in (a) of FIG. 6, and the Web browser 34a has been already activated to connect the PC 2 to the Web content creation server 3A via the Internet in order to edit the Web content.

In FIG. 11, as in FIG. 10, a user interface and a Web browser are illustrated as the processing for the PC 2, and content creation processing and metadata processing are illustrated as the processing for the blog server 3 and a map database (database) is illustrated as an object to be processed.

In FIG. 11, the processing of steps S201 to S207 is similar to that of steps S101 to S107 shown in FIG. 10. In the correspondence with FIGS. 7A and 7B, the image data transmitted from the PC 2 to the Web content creation server 3A in steps S201 and S202 is an image that is selected for creation of a Web page from among the images captured at A City, B City, C City, and D City. The area range received and stored by the content creation unit 52 from the map database 54b in step S207 is therefore the border area of France in Europe.

In step S208 shown in FIG. 11, the content creation unit 52 uses the image data obtained in step S202 and the data of the area range obtained in step S207 to create, for example, the Web pages shown in FIGS. 7A and 7B.

When a Web page is created in step S208, first, template data that, for example, the main page shown in FIG. 7A and the link page shown in FIG. 7B are based on is read from the template database 54c of the storage unit 54 and is received. In the main page, the map image data of the area range retrieved from the map database 54b is laid out in the image area AR1. The points indicating the locations of A City, B City, C City, and D City are further added to the map image.

The content creation unit 52 matches the transmitted position information of the image data with the retrieved map information. Therefore, it can be recognized that the position information of the image data is included in any of the areas of the four cities, that is, A City, B City, C City, and D City. The points indicating the locations of A City, B City, C City, and D City in the image area AR1 can be created according to the recognition result. Further, as described above, the names of the headings in the image area AR2 can also be created according to the recognition result by writing in the template so as to insert characters "A City", "B City", "C City", and "D City" to "xx" in the template character string "Travel Record for xx". The link information to be inserted to each of the headings is also written in the template.

In the link page shown in FIG. 7B, first, a writing operation for pasting the images corresponding to the transmitted image data into the image area AR3 is performed on the template. In the image area AR4, comments for the individual images pasted on the image area AR3 are entered in the comment fields. Information that can be automatically entered using, for example, the information contents recognized from the metadata of the image data or the relationship between the map information and the position information of the image data is entered in advance. In the case shown in FIG. 7B, information can be automatically entered in the entry "A City Date" in the comment field for each of the images. Information indicating that the position is located in A City can be obtained from the recognition result described above. The image capture date of the corresponding image is actually displayed in the date entry. This information can be obtained from the image capture date information stored in the metadata section of the image data.

In step S209, the entity data of the content information as the Web page created in step S208 is transmitted to the PC 2. In general, Web pages are created on the user's PC or the like and are uploaded to the Web content server or the like although, unlike blogs, the server does not manage the Web pages in the creation process. Therefore, the Web content creation server 3A has a function for supporting only the creation of Web pages serving as Web content, but unlike the blog server 3, is not configured to manage the content created for viewing on the Web. In step S209, therefore, the data entity of the created content is transmitted.

The user creates Web content using the data of the Web page that is automatically created and transmitted from the Web content creation server 3A to the PC 2 in the manner described above.

The present invention is not limited to the foregoing embodiment. For example, any technique for adding position information to image data may be employed. For example, position information may be added to captured and recorded image data by performing an editing operation. The image data with position information may not necessarily be image data whose entity section is not obtained by an image capturing operation, and may be of general image data form.

Web content to be automatically created may include various kinds of content in addition to those shown in FIGS. 5A, 5B, 7A, and 7B. The content information to be automatically created can therefore be any information other than Web content as long as the information is based on position information added to image data.

In the above-described embodiment, as can be understood from FIGS. 10 and 11, in order to automatically create content information, a PC operated by a user plays a role of receiving image data and transmitting the image data to a server, and the server performs content creation processing and metadata processing, and searches a map database. However, for example, the content creation function may be given to the PC, and the server may perform metadata processing and may search the map database in response to a search request from the PC. This arrangement allows the structure of the information processing apparatus according to the embodiment of the present invention to be divided into a plurality of apparatuses. Therefore, there is not limit to, as the concept of the present invention, to the number of functions shown in FIGS. 10 and 11 to be performed by the PC.

In an embodiment of the present invention, for example, a map database can be incorporated into the PC so that all the functions shown in FIGS. 10 and 11 can be performed within the PC. However, it is more appropriate that, as in the above-described embodiment, the content creation processing, the metadata processing, and the map database search are implemented as the functions of the server because it is better that the functions necessary for the PC operated by the user are easier and more general. In the embodiment, in the current state of the art, the user of the PC still uses an application generally installed in the PC, called a Web browser. This means that content can automatically be created with ease even without using a special application for content creation. Further, an apparatus for creating content can also have an advantage in that, for example, if an improvement is to be made to the content creation function, the program update or hardware reinforcement is performed only on the server, resulting in low administration load and high design flexibility.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus, comprising:
   image information obtaining means for obtaining image information representative of a photographed image or images having at least position information added thereto as additional information;
   template information obtaining means for obtaining template information from a template storage means for storing template information including a template of content information;
   map information obtaining means for obtaining map information corresponding to the position information added to the image information obtained by the image information obtaining means from map information stored in map information storage means; and
   content information creating means for automatically creating content information based on the map information obtained by the map information obtaining means on the basis of the template information, such that the content information is automatically created by use of the position information added to the image information,
   the content information creating means automatically creating a link page based on the image information and the map information such that, upon display on a display device, a first frame is displayed and includes a map image showing a geographic region containing every position or positions represented by the position information and showing a sub-region or sub-regions at each position or positions on the map image that corresponds to the position information and a respective heading for each of the sub-region or sub-regions, and a second frame is displayed adjacent to the first frame and includes a respective heading character string for each of the sub-region or sub-regions and formed of its respective heading inserted in a common template character string, each respective heading character string including a link to a corresponding further link page, said link page being accessible by an address available to Internet users.

2. The information processing apparatus according to claim 1, wherein:
   the image information obtaining means obtains image information transferred from content-information-creation user interface means, the content-information-creation user interface means having a user interface function for creating content information whose reproduction output style is defined by a predetermined markup language; and the information processing apparatus further comprises content transferring means for transferring the content information created by the content information creating means to the content-information-creation user interface means.

3. The information processing apparatus according to claim 1, wherein:

the image information obtaining means obtains image information transferred from content-information-creation user interface means, the content-information-creation user interface means having a user interface function for creating content information whose reproduction output style is defined by a predetermined markup language.

4. An information processing method, comprising:

obtaining image information representative of a photographed image or images having at least position information added thereto as additional information;

obtaining map information corresponding to the position information added to the obtained image information from map information stored in map information storage means;

creating automatically content information by use of a processor based on the obtained map information on the basis of template information that is stored in template information storage means and that the content information is based on, such that the content information is automatically created by use of the position information added to the image information; and creating automatically a link page based on the image information and the map information such that, upon display on a display device, a first frame is displayed and includes a map image showing a geographic region containing every position or positions represented by the position information and showing a sub-region or sub-regions at each position or positions on the map image that corresponds to the position information and a respective heading for each of the sub-region or sub-regions, and a second frame is displayed adjacent to the first frame and includes a respective heading character string for each of the sub-region or sub-regions and formed of its respective heading inserted in a common template character string, each respective heading character string including a link to a corresponding further link page, said link page being accessible by an address available to Internet users.

5. A non-transitory computer readable medium having stored thereon a program for allowing an information processing apparatus to execute an information processing method, the method comprising:

obtaining image information representative of a photographed image or images having at least position information added thereto as additional information;

obtaining map information corresponding to the position information added to the obtained image information from map information stored in map information storage means;

creating automatically content information based on the obtained map information on the basis of template information that is stored in template information storage means and that the content information is based on, such that the content information is automatically created by use of the position information added to the image information; and creating automatically a link page based on the image information and the map information such that, upon display on a display device, a first frame is displayed and includes a map image showing a geographic region containing every position or positions represented by the position information and showing a sub-region or sub-regions at each position or positions on the map image that corresponds to the position information and a respective heading for each of the sub-region or sub-regions, and a second frame is displayed adjacent to the first frame and includes a respective heading character string for each of the sub-region or sub-regions and formed of its respective heading inserted in a common template character string, each respective heading character string including a link to a corresponding further link page, said link page being accessible by an address available to Internet users.

6. An information processing apparatus, comprising:

an image information obtaining unit operable to obtain image information representative of a photographed image or images having at least position information added thereto as additional information;

a template information obtaining unit operable to obtain template information from a template storage unit operable to store template information including a template of content information;

a map information obtaining unit operable to obtain map information corresponding to the position information added to the image information obtained by the image information obtaining unit from the map information stored in a map information storage unit; and a content information creating unit operable to automatically create content information based on the map information obtained by the map information obtaining unit on the basis of the template information, such that the content information is automatically created by use of the position information added to the image information, the content information creating unit being operable to automatically create a link page based on the image information and the map information such that, upon display on a display device, a first frame is displayed and includes a map image showing a geographic region containing every position or positions represented by the position information and showing a sub-region or sub-regions at each position or positions on the map image that corresponds to the position information and a respective heading for each of the sub-region or sub-regions, and a second frame is displayed adjacent to the first frame and includes a respective heading character string for each of the sub-region or sub-regions and formed of its respective heading inserted in a common template character string, each respective heading character string including a link to a corresponding further link page, said link page being accessible by an address available to Internet users.

7. The information processing apparatus according to claim 1, wherein the content information creating means automatically creates the link page based on the image information and the map information such that, upon display on a display device, a respective photographed image or images are displayed at the position or positions on the map image represented by the position information.

8. The information processing method according to claim 4, further comprising creating the link page based on the image information and the map information such that, upon display on a display device, a respective photographed image or images are displayed at the position or positions on the map image represented by the position information.

9. The non-transitory computer readable medium according to claim 5, wherein the method further comprises creating the link page based on the image information and the map information such that, upon display on a display device, a respective photographed image or images are displayed at the position or positions on the map image represented by the position information.

10. The information processing apparatus according to claim 6, wherein the content information creating unit is operable to automatically create the link page based on the image information and the map information such that, upon display on a display device, a respective photographed image or images are displayed at the position or positions on the map image represented by the position information.

* * * * *